US010613675B2

(12) United States Patent
Stone et al.

(10) Patent No.: US 10,613,675 B2
(45) Date of Patent: Apr. 7, 2020

(54) INFORMATION HANDLING SYSTEM TOTEM PRESSURE SENSOR

(71) Applicant: Dell Products L.P., Round Rock, TX (US)

(72) Inventors: Lawrence A. Stone, Austin, TX (US); Sathish K. Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/495,352

(22) Filed: Apr. 24, 2017

(65) Prior Publication Data

US 2018/0307364 A1    Oct. 25, 2018

(51) Int. Cl.
G06F 3/044    (2006.01)
G06F 3/041    (2006.01)

(52) U.S. Cl.
CPC ............ G06F 3/0416 (2013.01); G06F 3/044 (2013.01); *G06F 2203/04105* (2013.01)

(58) Field of Classification Search
None
See application file for complete search history.

(56) References Cited

U.S. PATENT DOCUMENTS 5,982,355 A * 11/1999 Jaeger ................. G02F 1/13306
345/161
7,388,578 B2    6/2008 Tao
2008/0238879 A1    10/2008 Jaeger et al.
2009/0015549 A1*    1/2009 Gelfond ................. G06F 3/0362
345/156
2010/0207899 A1*    8/2010 Oh .......................... G06F 3/023
345/173
2011/0248947 A1    10/2011 Krahenbuhl
2012/0267222 A1*    10/2012 Gohng .................... G06F 3/016
200/61.54
2013/0257793 A1*    10/2013 Zeliff ...................... G06F 3/044
345/174
2014/0210748 A1*    7/2014 Narita ................... G06F 3/0354
345/173
2014/0282142 A1*    9/2014 Lin ........................ A61B 8/467
715/765
2014/0327628 A1*    11/2014 Tijssen .................. G06F 3/0488
345/173
2015/0015489 A1*    1/2015 Vaganov ............. G06F 3/03545
345/158

(Continued)

OTHER PUBLICATIONS

3Dconnexion SpaceNavigator® http://www.3dconnexion.com/products/spacemouse/spacenavigator.html, printed Apr. 25, 2017.

(Continued)

*Primary Examiner* — Nitin Patel
*Assistant Examiner* — Amen Woldesenbet Bogale
(74) *Attorney, Agent, or Firm* — Zagorin Cave LLP; Robert W. Holland

(57) ABSTRACT

An information handling system interacts with a totem through a touchscreen display, such as with movement of the totem or pressured applied on the totem. A totem holder manages totem position on the touchscreen display to maintain the totem in a desired location, such as to prevent sliding of the totem in the event of motion of the touchscreen display from a horizontal to a more vertical orientation.

20 Claims, 6 Drawing Sheets

(56) References Cited

U.S. PATENT DOCUMENTS

| | | | |
|---|---|---|---|
| 2016/0173670 A1 | 6/2016 | Langhein | |
| 2017/0090604 A1* | 3/2017 | Barbier | G06F 3/0488 |
| 2017/0322642 A1* | 11/2017 | Zhang | G06F 3/011 |
| 2018/0074639 A1* | 3/2018 | Powell | G06F 3/044 |
| 2018/0314357 A1* | 11/2018 | Klein | G05G 5/03 |
| 2019/0012003 A1* | 1/2019 | Grant | G06F 3/0362 |

OTHER PUBLICATIONS

Wacom, Pen Tablets, http://www.wacom.com/en-us/products/pen-tablets, screenshot printed Apr. 25, 2017.
Apple, Apple Pencil http://www.apple.com/apple-pencil, printed Apr. 25, 2017.
Microsoft, Surface Pen, https://www.microsoft.com/surface/en-us/accessories/pen, printed Apr. 25, 2017.
Samsung, Galaxy Note 5 S Pen, http://www.samsung.com/global/galaxy/galaxy-note5/spen, printed Apr. 25, 2017.
Microsoft, Surface Dial, https://www.microsoft.com/en-us/surface/accessories/surface-dial, printed Apr. 25, 2017.

* cited by examiner

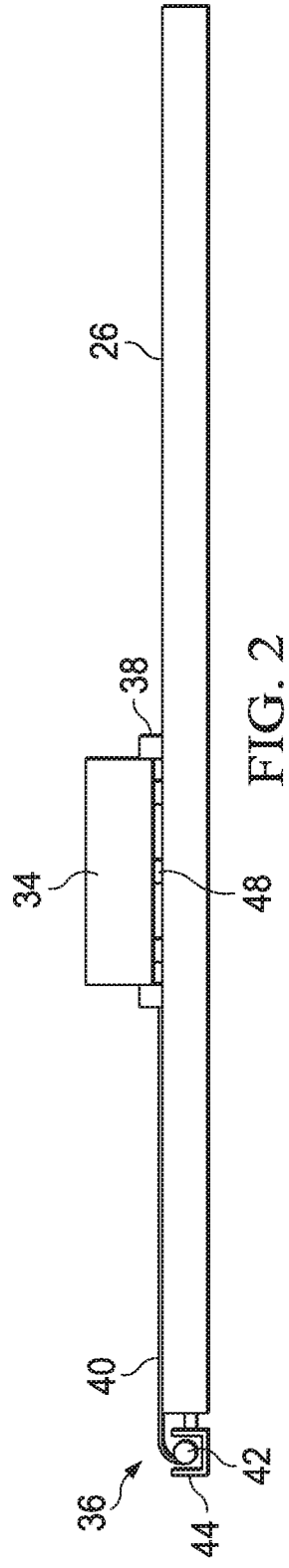
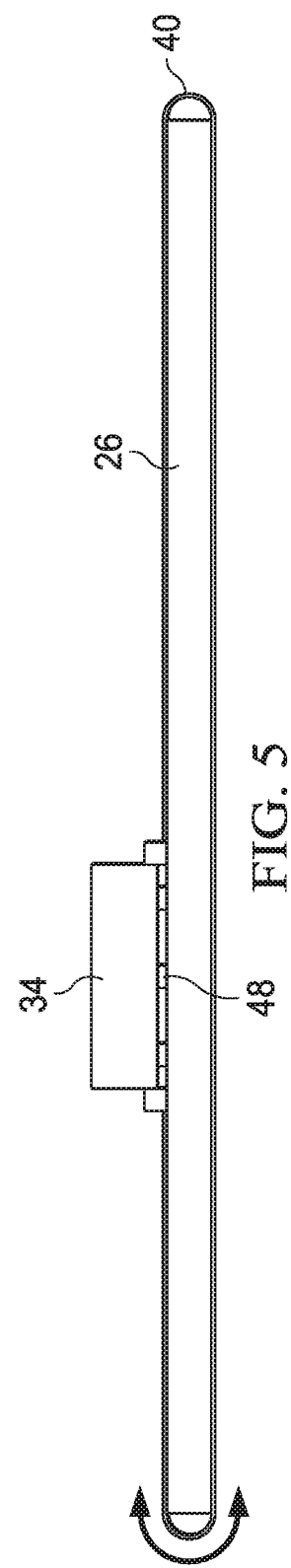

INFORMATION HANDLING SYSTEM TOTEM PRESSURE SENSOR

CROSS REFERENCE TO RELATED APPLICATION

U.S. patent application Ser. No. 15/495,364, entitled "Information Handling System Totem Holder" by inventors Lawrence A. Stone and Sathish K. Bikumala, filed on even date herewith, describes exemplary methods and systems and is incorporated by reference in its entirety.

BACKGROUND OF THE INVENTION

Field of the Invention

The present invention relates in general to the field of information handling system input devices, and more particularly to an information handling system totem pressure sensor.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems interact with end users through a number of different input/output (I/O) devices. Desktop information handling systems typically have a display, keyboard and mouse connected through cables, such as USB or DisplayPort cables. Portable information handling systems typically integrate a display and keyboard in a portable housing, and also offer cable ports to interact with conventional cabled peripheral devices. Many portable information handling systems include a touchscreen display that accepts touch inputs. In tablet information handling systems, the touchscreen display is often the only integrated I/O device with end users making typed inputs through a virtual keyboard displayed at the touchscreen. Other peripheral I/O devices interact through wireless interfaces, such as Bluetooth. Thus, for example, a portable information handling system may offer an integrated touchscreen and a wireless keyboard peripheral so that the end user can type more quickly when needed.

As touchscreens have gained acceptance in portable information handling systems, larger touchscreens have become more common in desktop information handling system environments. In some instances, all-in-one desktop systems are built in planar housings similar to tablet information handling systems so that end users can interact with the system through conventional peripheral I/O devices or through a touchscreen. More recently, horizontally-disposed touchscreen displays that rest on a desktop surface of a visually-interactive desktop environment in which end users use touches to make inputs and have visual information presented in a readily-accessible location. For example, an end can write with a pen on the touchscreen instead of typing, or draw with a pen to update CAD or other drawing files. The horizontal disposition of the touchscreen display bridges the physical and digital worlds to allow end users to interact with digital content as if physical content was available. Light weight but robust construction of the horizontal display allows end users to tilt the display over a desktop for more natural touch inputs.

In addition to accepting direct touches by an end user, a horizontally-disposed display provides an interface for interactions by "dumb" devices, such as totems. A totem rests on the touch surface and translates movements and inputs from an end user into defined touches at the touch surface. For example, feet on a totem bottom surface have a defined pattern that provides for totem recognition and discerns the totem location and orientation. For instance, a totem having a form factor of a dial rotates on a touchscreen to accept inputs from an end user discerned based upon the relative rotational position of the dial. Inputs made at the totem translate to the touchscreen so that the display can present a user interface aligned with the dial inputs. Totem devices provide natural tools to make inputs but at a low cost since no intelligence is required in the totem itself.

SUMMARY OF THE INVENTION

Therefore, a need has arisen for a system and method which adapt totems to include touch and wireless communication for detecting pressure.

A further need exists for a system and method that holds totems in place when horizontal displays are tilted.

In accordance with the present invention, a system and method are provided which substantially reduce the disadvantages and problems associated with previous methods and systems for interacting with a touchscreen display with a totem. A totem that includes a strain gauge and wireless interface provides touch and wireless pressure sensing to an information handling system. A totem holder engages the totem at the touchscreen to maintain the totem position during motion of the touchscreen, such as a tilting of the touchscreen from a horizontal orientation to a more vertical orientation.

More specifically, an information handling system processes information with a processor and memory, and interacts with end users through input/output devices, such as a horizontally disposed touchscreen display. End user inputs at totem devices translate to touches at the touchscreen display so that a touch controller and/or embedded controller provide the inputs to the processor. A graphics processor unit interfaced with the processor generates pixel values that present visual images at the touchscreen display. In one embodiment, the horizontally-disposed touchscreen display includes a stand that raises the touchscreen display to a more vertical orientation. A totem holder engages the totem so that the totem does not slide as the display tilts from a horizontal to vertical orientation. The totem holder provides selectable motion between different locations of the display for placement in a location convenient to an end user, such as with a strap and adjustable receptacle that adjusts the strap length. A totem support maintains the totem position while allowing rotation of the totem to provide rotational position inputs at the touchscreen display. As an alternative, the totem accepts inputs based upon an amount of pressure by an end user press on the totem upper surface. Pressure is detected at the totem, such as with a strain gauge, and communicated to the information handling system, such as through a wireless interface or a touch by a totem component to the touchscreen display. As an example, an end user varies pressure at a totem to indicate varying line thickness for drawing by a pen done on the touchscreen display. With a wireless interface, the totem accepts inputs of end user pressure when located off the touchscreen display, such as if the totem is used in a foot pedal configuration.

The present invention provides a number of important technical advantages. One example of an important technical advantage is that a totem on a touchscreen detects pressure placed on the totem to provide end users with an input to an information handling system. Pressure sensed with a strain gauge or other mechanical device results in a value provided to the information handling system that the system can use at different user interfaces, such as to vary a quantity, change a drawn line thickness, adjust brightness, adjust color, or other similar input values. When placed on the touchscreen, a mechanical interface allows pressure measurements to be passed with touch inputs to the touchscreen. Integrated Bluetooth or other wireless communication interfaces provide wireless measurements when touch communication is not available.

Another example of an important technical advantage is that the totem is held in place during movement of the horizontal display, such as titling. The user has access to the totem in a desired position while interacting with the touchscreen at an angle, such as a tilt. The totem holder readily moves the totem to desired locations and maintains the totem in a position as the display angle changes. Convenient multi-angle totem interactions provide a more predictable end user interface for one handed interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a side view of a totem device maintained in a position on a touchscreen display by a totem holder;

FIG. 5 depicts FIG. 5, a side view depicts an example embodiment of a totem holder that holds a totem in a position;

DETAILED DESCRIPTION

End user interactions detected as pressure applied at a totem are communicated to an information handling system for application as inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
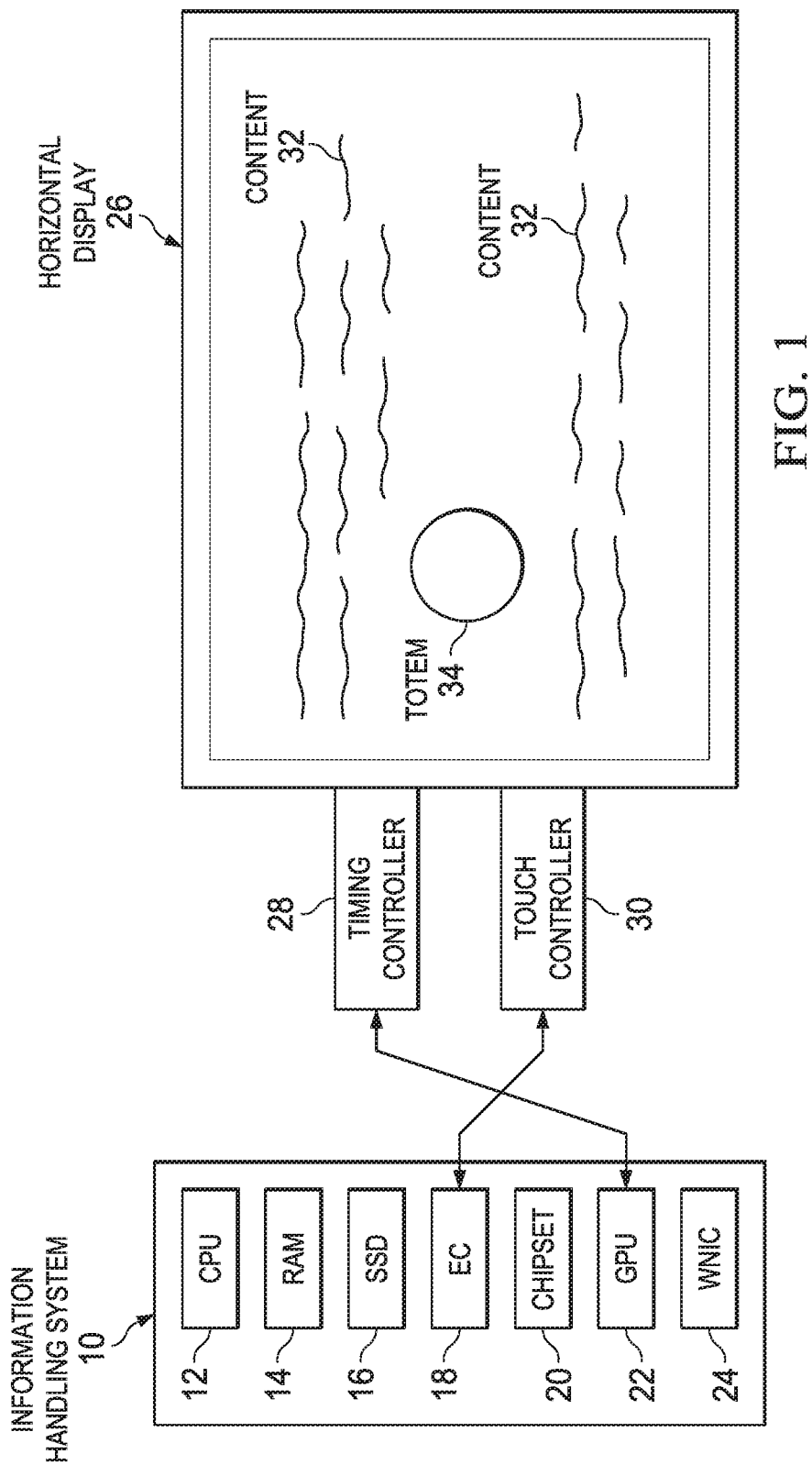
FIG. 1 depicts a block diagram of a system for communicating touchscreen display touches by a totem to an information handling system.

Referring now to FIG. 1, a block diagram depicts a system for communicating touchscreen display touches by a totem 34 to an information handling system 10. In the example embodiment, information handling system has plural processing components that cooperate to process information. A central processing unit (CPU) 12 executes instructions in cooperation with random access memory (RAM) 14, which stores the instruction and information. For example, an operating system stored in persistent memory, such as a solid state drive (SSD) 16, is booted to RAM 14 for execution on CPU 12 to manage execution of other applications. An embedded controller 18 executes embedded code, such as firmware instructions stored in flash memory, to manage I/O devices and power application. A chipset 20 includes processors, controllers and embedded code to manage devices on a physical layer, such as control and allocation of memory and bus communication. A graphics processing unit (GPU) 22 receives visual information generated by CPU 12 and defines visual images with pixel values that resolve to visual images on a display 26. A wireless network interface card (WNIC) 26 provides wireless communication, such as through Bluetooth, WiFi and other network interfaces.

Visual information defined as a visual image with pixel values is communicated for presentation to a horizontal display 26 through a timing controller 28, which forwards pixel values to the pixels of display 26 to create the visual image presented as content 32. In the example embodiment, horizontal display 26 is a touchscreen display that rests in a substantially horizontal orientation, such as on a desktop. End users interact with content 32 by touches to display 26, such as by interacting with user interfaces that present input values. As an example, a keyboard presented as content 32 on display 26 accepts key inputs at depicted keys so that presses on a particular key indicates an input of that key value. A touch controller 30 detects touch positions and provides the input of the touch position to embedded controller 18 for use as an input by CPU 12. Totem 34 provides a physical input tool that accepts end user inputs through manipulation of totem 34. For example, totem 34 aids with inputs made by movement of totem 34 to different locations of display 26 or rotational motion of totem 34. In one example embodiment, totem 34 has a line thickness user interface presented about its periphery so that the end user rotates totem 34 to select a line thickness. In various embodiments, totem 34 may represent other types of inputs, such as color, contrast, numerical values, speaker volume or any other value controlled by inputs to information handling system 10.

Referring now to FIG. 2, a side view depicts a totem 34 device maintained in a position on a touchscreen display 26 by a totem holder 36. Horizontal display 12 provides an adjustable user work space that an end user may pick up and move or tilt in order to more comfortably enter information at the touchscreen. As the orientation of display 26 raises on one side from a horizontal to a more vertical orientation, totem 34 may tend to move as gravity pulls totem 34 to the lower portion of the more vertical orientation. Similar movement can occur in a side direction if display 26 is raised on one side relative to another. Totem holder 36 maintains totem 34 in position by coupling to totem 34 and a portion of display 26. In the example embodiment, totem holder 36 has a support 38 that engages totem 34 and a strap 40 that couples totem support 38 to a side of display 26, such as the raised side. In the example embodiment, strap 40 couples to a slide 42 that provides movement of strap 40 from side to side of display 26. Slide 42 has a receptacle 44 that rolls up strap 40 to adjust the length and thus the vertical position of totem support 38 on display 26. An end user places totem support 38 in a desired location and then locks slide 42 and receptacle 44 in position so that totem 34 remains at a desired location of display 26 as the orientation of display 26 changes.

With totem 34 maintained in a constant location, an end user may make inputs through totem 34 in a number of different ways. In one example embodiment, feet 48 at the bottom surface of totem 34 include capacitance that provides a detectable touch pattern discernible by touch controller 30. Support 38 allows rotation of totem 34 so that the end user can make inputs by rotation of totem 34 while totem 34 is maintained in a desired location on display 26. In an alternative embodiment, support 38 restricts rotation of a base portion of totem 34 while internal moving parts within totem 34 allow rotation movement of feet 48. In one alternative embodiment described in greater depth below, totem 34 includes a pressure sensor that detects force applied against totem 34 and outputs the amount of force as an input to information handling system 10. Advantageously, in one embodiment detecting inputs by a pressure sensor provides inputs without any relative motion of totem 34 to display 26 so that totem holder 36 may securely maintain the position of totem 34 in place.

Figure 3:
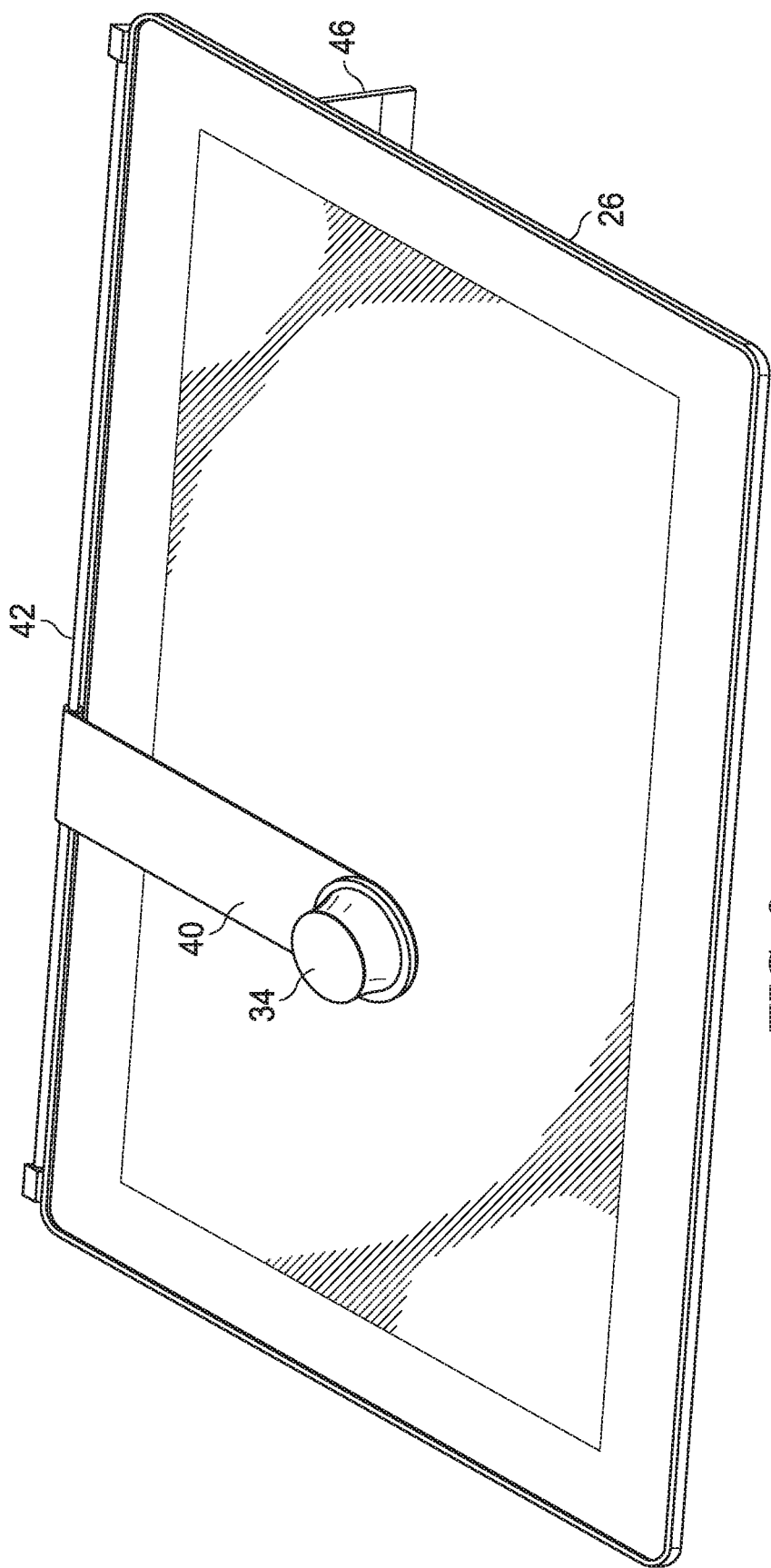
FIG. 3 depicts a side perspective view of a totem held in position by a totem holder with a horizontal display raised so a more vertical orientation.

Referring now to FIG. 3, a side perspective view depicts a totem 34 held in position by a totem holder 36 with a horizontal display 26 raised to a more vertical orientation. For example, an end user drawing on display 26 deploys a stand 46 to raise one side of display 26 to allow a better angle for making drawing inputs. Stand 46 raises display 26 from horizontal orientation to a slightly more vertical orientation, although in alternative embodiments display 26 may be raised to a completely vertical orientation. Totem 34 is held midway down the height of display 26 by strap 40, which varies in length to raise or lower the height at which totem 34 is held. Slide 42 couples to strap 40 so that a user can slide totem 34 laterally across the length of display 26. An end user moves totem 34 to a location on display 26 at which inputs may be made with totem 34 not otherwise interfering with visual images presented at display 26. For example, strap 40 is made of a transparent of translucent material that allows visual images to pass through. The touch controller of display 26 is programmed to recognize the shape of strap 40 so that touch inputs are filtered to prevent strap 40 from interfering with end user touches. A strap receptacle in slide 42 rolls strap 40 up and down to adjust totem 34 height with totem 34 fitting into a support at the end of strap 40, such as with a pouch facility or plastic snap sized to fit the base of totem 34. In alternative embodiments, alternative types of securing devices may be used, such as opposing ductile fabric that attracts to each other, like Velcro.

Figure 4:
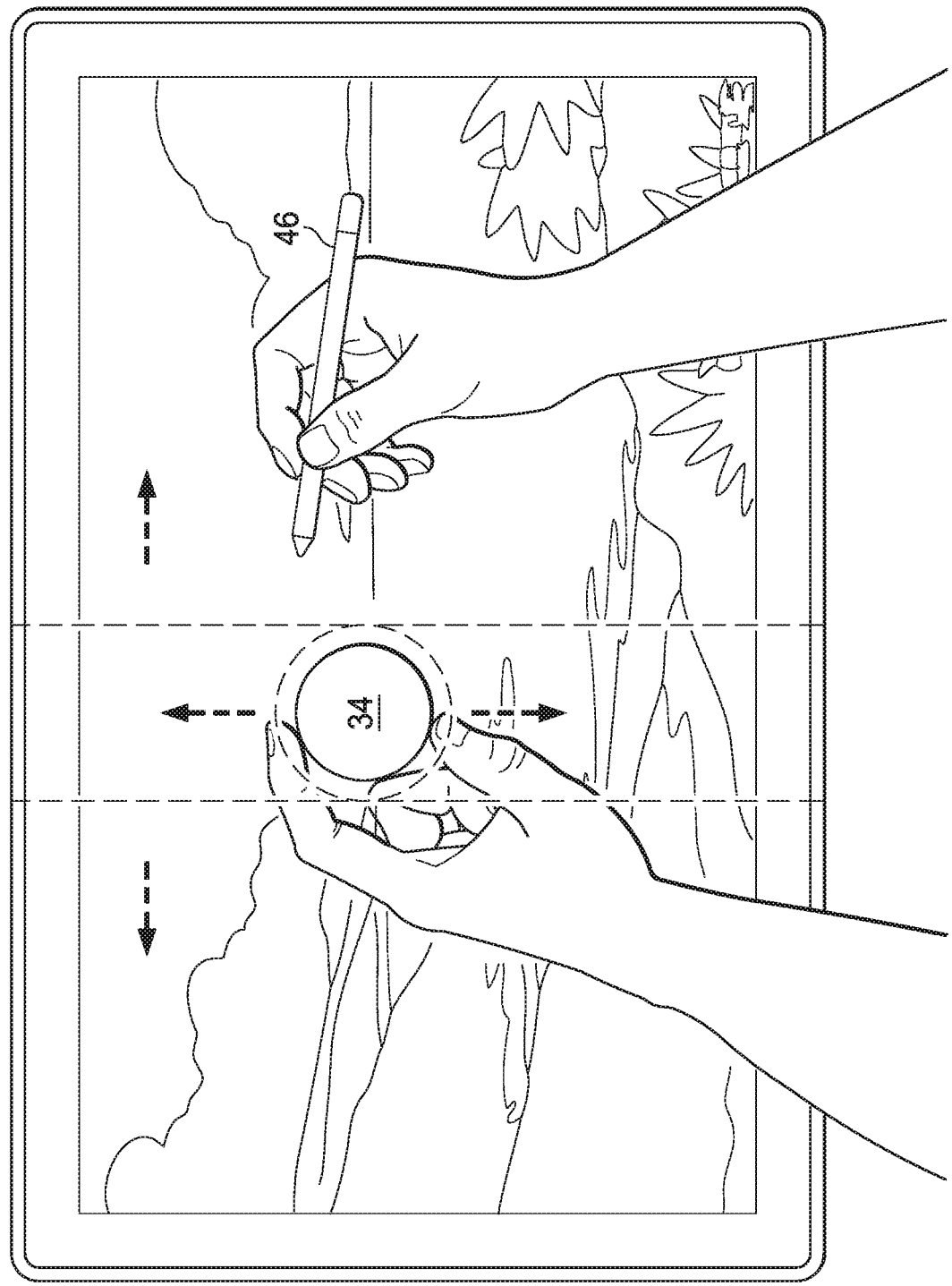
FIG. 4 depicts a side perspective view of an example of end user interactions with a totem maintained in position by a totem holder on a horizontal display raised to a more vertical orientation.

Referring now to FIG. 4, a side perspective view of an example of end user interactions with a totem 34 maintained in position by a totem holder 36 on a horizontal display raised to a more vertical orientation. An end user interacts with display 26 through a pen 46 by inputting hand drawn lines on display 26. Totem 34 adjusts to different positions on display 26 to allow an end user to have her other hand free to make inputs with totem 34 while drawing with pen 46. Totem 34 provides a convenient input resource for changing drawing effects, such as color, contrast, line thickness, etc. . . . . Totem holder 36 supports inputs by totem 34 even when display 26 is raised from a horizontal orientation by maintaining totem 34 in a position desired by the end user.

Referring now to FIG. 5, a side view depicts an example embodiment of a totem holder 36 that holds a totem 34 in a position. In the example embodiment, strap 40 encircles display 26 to hold totem 34 in a selected position. For example, strap 40 is an elastic material that stretches to maintain a position on display 26 and snaps at opposing ends to opposing sides of totem 34. Alternatively, strap 40 includes a tactile material or pouch that holds totem 34. The end user moves totem 34 to different relative positions by sliding totem 34, thus pulling strap 40 to a desired configuration. If high angles of display 26 are used, additional support to maintain strap 40 in position may be used, such as clip or snap that engages a side of display 26.

Figure 6:
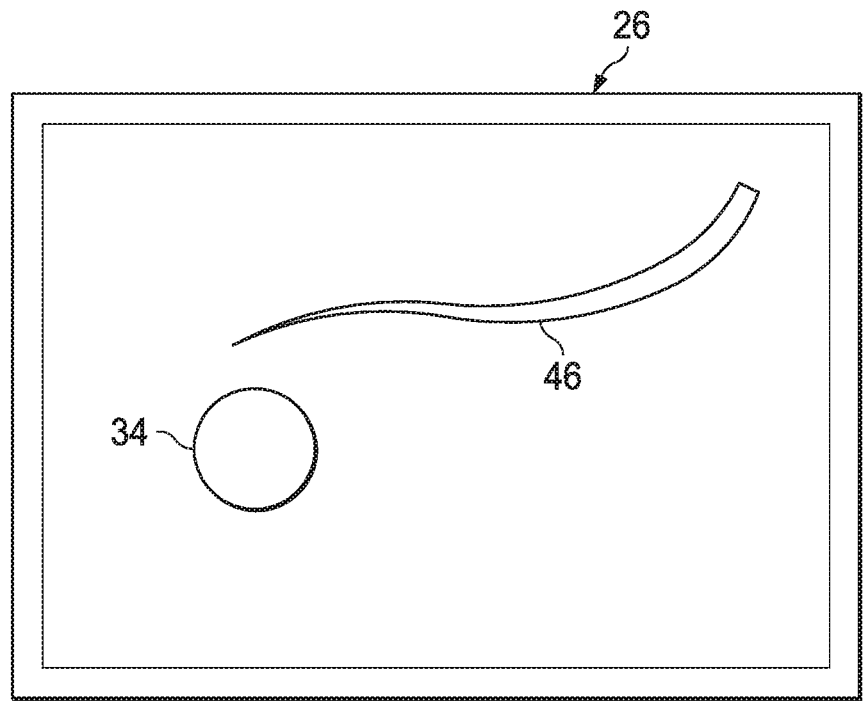
FIG. 6 depicts an example of inputs applied from a pressure sensor totem to adapt drawing marks made on a touchscreen display.

Referring now to FIG. 6, an example is depicted of inputs applied from a pressure sensor totem 34 to adapt drawing marks made on a touchscreen display 26. As pen 46 draws a line across display 26, an end user applies increase pressure on the top of totem 34 to increase the thickness of the drawn line. A similar effect may be achieved by rotating totem 34, however, use of a pressure sensor provides for inputs in situations where rotational movement of totem 34 is not readily available, such as if a totem holder has engaged totem 34. Pressure sensing may remain while a totem is detected on display 26 or may be selected as a default input when display 26 detects the presence of a totem 34 in in a totem holder. In one embodiment, an end user selects pressure sensing inputs by tapping on display 34 to turn pressure sensing inputs on and off. Sensitivity of pressure sensor inputs may also be adjusted by taps on display 26 or by turning totem 34. For example, the proportion of force detected at a totem 34 to the input value applied by an information handling system is adjusted by rotating totem 34 as force is applied. In this manner, an end user may fine tune the inputs made by the pressure sensor for more exact inputs of information. Logic in the touch controller, embedded controller and/or an operating system executing on CPU 12 detects end user selections of input value proportions to adjust inputs for a given pressure applied to a totem 34.

Figure 7:
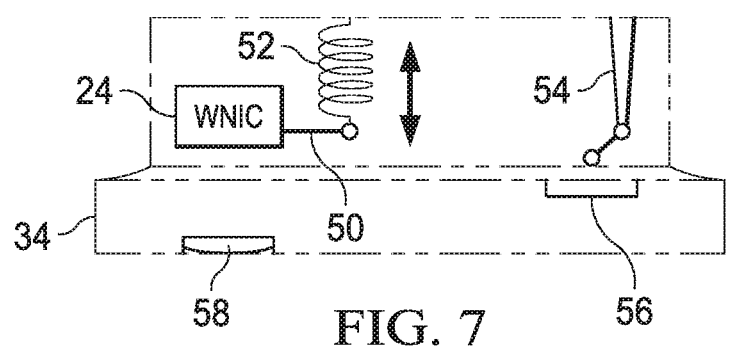
FIG. 7 depicts a side view of a totem device having an integrated pressure sensor.

FIG. 7 depicts a side view of a totem 34 device having an integrated pressure sensor. As depicted in FIG. 7, pressure pressing down on an upper surface of totem 34 may be detected with a variety different sensors arranged in a variety of different manners. For example, a strain gauge 50 has forces from pressure applied to it to generate a signal representing the amount of pressure applied to totem 34. In one embodiment, a downward force on totem 34 compresses strain gauge 50 to decrease the strain measurement from a neutral maximum reading that is output when no pressure is applied. Alternatively, a spring 52 cooperates with strain gauge 50 so that as pressure is applied on totem 34 the amount of strain detected increases. In another embodiment, pressure applied to totem 34 translates through a strain lever arm 54 that touches display 26 along a pressure position 56. The relative location of strain lever arm 54 to the side of totem 34 indicates the amount of pressure pressing down on totem 34. Strain lever arm 54 provides a mechanical measurement of pressure, and strain gauge 50 may also provide a pressure reading to display 26 through a touchscreen interaction, such as by outputting a capacitance level or adjusting a physical member. Alternatively, strain gauge 50 interfaces with a WNIC 24 to wirelessly communicate pressure to an information handling system, such as through a Bluetooth communication. Advantageously, wireless communication of pressure sensor readings allows totem 34 to operate off the display 26, such as in a foot pedal.

Totem 34 may include a variety of physical configurations that further aid end user interactions at a display. One example is a suction position lock 58 disposed at a bottom surface of totem 34. To freeze the position of totem 34, an end user pushes down and releases to create a suction attraction between totem 34 and display 26. Totem 34 releases with a second push and/or twist that equalizes the vacuum attraction. In one embodiment, totem 34 includes an outer perimeter section with suction position lock 58 that locks totem 34 in position and an inner section that rotates within the outer perimeter section so that an end user can make rotation inputs at totem 34 with suction position lock 58 secured. Other types of position holding devices may be used to help maintain a totem 34 in a fixed position on a display.

Figure 8:
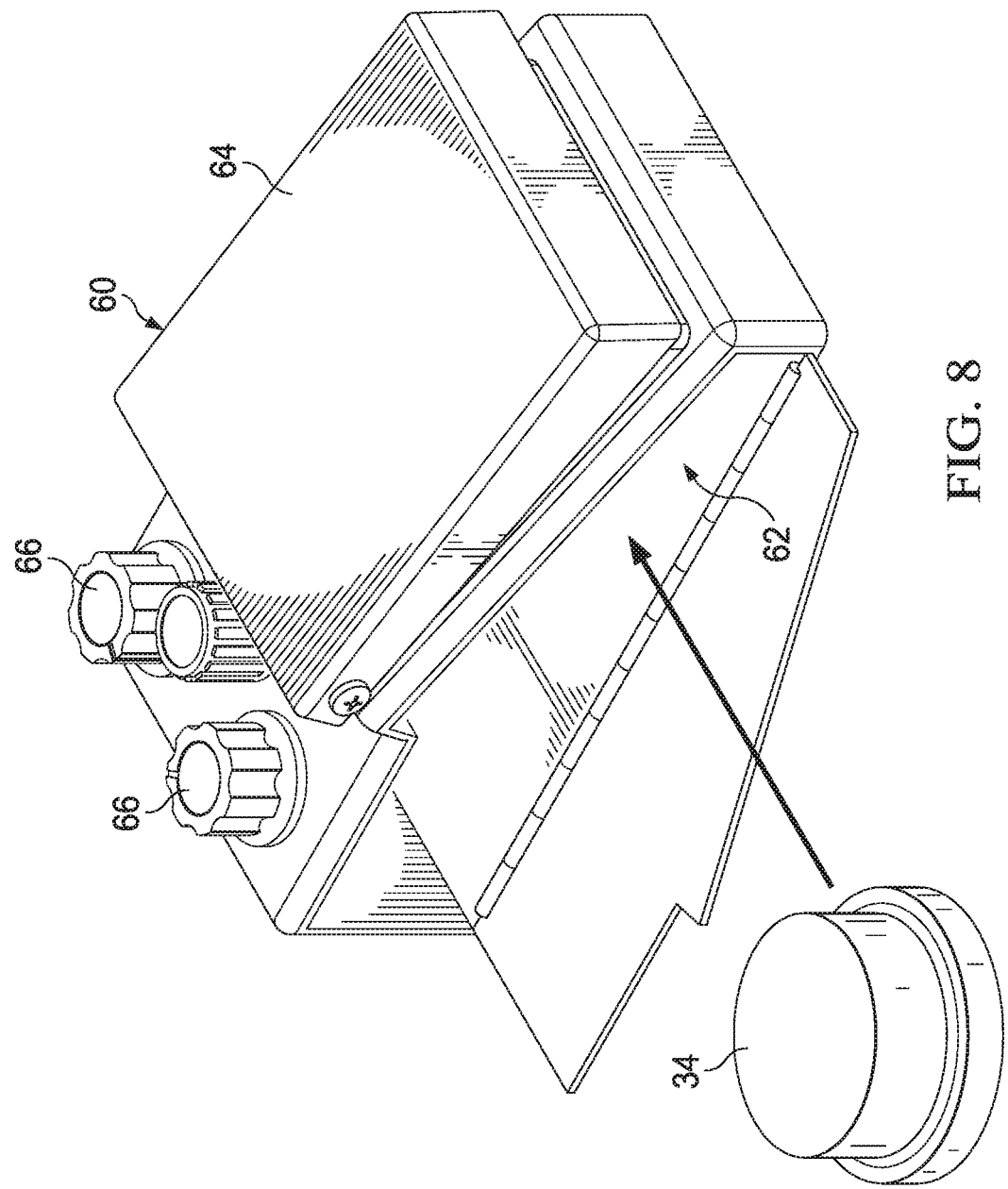
FIG. 8 depicts an example embodiment of a pressure sensing totem that inserts into a foot pedal to interact with an information handling system.

Referring now to FIG. 8, an example embodiment depicts a pressure sensing totem 34 that inserts into a foot pedal 60 to interact with an information handling system 10. In the example embodiment, totem 34 includes a wireless interface that supports communication with information handling system 10 of pressure sensor readings, such as from a strain gauge. In one embodiment, totem 34 is placed on the ground and stepped on with a foot to induce pressure sensor readings related to pressure applied by the foot. For example, rather than pressing on totem 34 with a hand to induce pressure that adapts writing on a touchscreen display, an end user adjusts writing parameters with foot inputs, thus leaving two hands free to interact with the display. In some instances, totem 34 will shift between foot and hand pressure sensor readings where foot use can cause dirt to accumulate that makes hand use less comfortable and convenient. Instead, totem 34 inserts into a foot pedal 60 that translates foot pressure to totem 34 without direct foot contact. In the example embodiment, totem 34 inserts into a cavity 62 so that the upper surface of totem 34 aligns to accept inputs from foot plunger 64 when an end user presses on foot pedal 60. Mechanical adjustment dials 66 adapt motion of foot plunger 64 to provide a desired input pressure to totem 34 for a given foot pressure. In one embodiment, totem 34 and or touchscreen display 26 detects that totem 34 is not in contact with touchscreen display 34 so that the pressure sensor within totem 34 configures to accept inputs in a foot pedal mode, such as by automatically setting sensitivity of the pressure sensor to provide values for pressure that relate to foot rather than hand usage.

Although the present invention has been described in detail, it should be understood that various changes, substitutions and alterations can be made hereto without departing from the spirit and scope of the invention as defined by the appended claims.

What is claimed is:

1. A system for interacting with an information handling system, the system comprising:
   a touchscreen display operable to present information as visual images and to accept touches as inputs;
   a totem having a disc shape and a bottom surface configured to touch the touchscreen in an identifiable pattern so that movement applied to the totem is discernible as inputs at the touchscreen display;
   a stylus configured to touch the touchscreen display to present end user inputs at the touchscreen display as lines drawn at stylus touch locations; and
   a pressure sensor disposed in the totem, the pressure sensor detecting an amount of force applied against an upper surface of the totem and communicating the amount of force as quantity values to the information handling system, the quantity values varying in proportion to the amount of force;
   wherein the information handling system presents the stylus lines with a thickness varied based upon one of rotation of the totem or the amount of force.

2. The system of claim 1 further comprising:
   a wireless network interface card integrated in the totem and interfaced with the pressure sensor to report the quantity values with wireless communications; and
   instructions stored in non-transitory memory of the information handling system, the instructions when executed on a processor causing the pressure sensor values to be applied as inputs.

3. The system of claim 2 wherein touch inputs at the touchscreen display adjust the sensitivity of the quantity values for a given amount of force by adjusting the proportion of force detected to the quantity value.

4. The system of claim 2 wherein touch inputs at the touchscreen display adjust the application of quantity values as inputs between on and off states.

5. The system of claim 4 wherein a touch input to an off state turns off the wireless communications.

6. The system of claim 4 wherein a touch input to an off state turns off application of the quantity values as inputs by the instructions.

7. The system of claim 2 wherein the pressure sensor comprises a strain gauge disposed in the totem and aligned to detect increased strain as the amount of force applied at the totem upper surface increases.

8. The system of claim 2 wherein the pressure sensor comprises a strain gauge disposed in the totem and biased to a strained condition, the strain gauge aligned to detect increased strain as the amount of force applied at the totem upper surface decreases.

9. The system of claim 1 wherein the pressure sensor comprises a member that aligns to different positions relative to the totem bottom surface based upon the amount of force applied to the totem upper surface, the different positions communicating the amount of force quantity values with touch to the touchscreen display.

10. A method for interacting with an information handling system, the method comprising:
disposing a totem on a touchscreen display surface;
locking an outer perimeter section of the totem in position on the touchscreen display surface;
rotating an inner perimeter section of the totem relative to the outer perimeter as a first input to the information handling system;
pressing down on the totem with varying amounts of force, the amount of force providing second input to the information handling system;
detecting the amount of force with a pressure sensor integrated in the totem; and
communicating one of the rotating or the amount of force as a quantity value to the information handling system for use as by the information handling system, the quantity value varying in proportion to the amount of force.

11. The method of claim 10 wherein detecting the amount of force at the totem further comprises detecting increased strain at a strain gauge with increased pressure placed on the totem.

12. The method of claim 11 wherein detecting the amount of force at the totem further comprises detecting decreased strain at the strain gauge with increased pressure placed on the totem.

13. The method of claim 10 wherein detecting the amount of force at the totem further comprises detecting motion translated to touches at the touchscreen display in response to pressure placed on the totem.

14. The method of claim 13 further comprising:
removing the totem from the touchscreen display; and
communicating the amount of force quantity values to the information handling system through a wireless signal.

15. The method of claim 10 further comprising:
turning on the detecting the amount of force at the totem with a first touch indication at the touchscreen display, the turning on communicating the amount of force quantity values to the information handling system for application as an input; and
turning off the detecting the amount of force at the totem with a second touch indication at the touchscreen display, the turning off stopping the communicating the amount of force quantity values to the information handling system.

16. The method of claim 15 wherein the first and second touches comprise finger taps on the touchscreen display.

17. The method of claim 10 further comprising adjusting the quantity value for a given amount of force by rotating the totem.

18. A totem system comprising:
a totem housing having a circular disc shape with an inner portion and outer portion, the inner portion rotating relative to the outer portion with the outer portion resting stationary on a touchscreen display;
a pressure sensor in the totem housing, the pressure sensor operable to detect an amount of force applied to press down on an upper surface of the totem housing;
a communication device operable to communicate the amount of rotation and the amount of force to an information handling system, the amount of force communicated as a quantity value that varies in proportion to the amount of force; and
instructions stored in non-transitory memory of the information handling system that when executed on a processor apply one of the amount of rotation or the amount of force to process information, the amount of rotation or amount of force selected based upon a setting at the information handling system.

19. The totem system of claim 18 wherein the pressure sensor comprises a strain gauge and the communication device comprises a wireless network device.

20. The totem system of claim 18 wherein the pressure sensor comprises an arm that touches the touchscreen display at different locations based upon the amount of pressure.

* * * * *